US008407189B2

(12) United States Patent
Drews et al.

(10) Patent No.: US 8,407,189 B2
(45) Date of Patent: Mar. 26, 2013

(54) FINDING AND FIXING STABILITY PROBLEMS IN PERSONAL COMPUTER SYSTEMS

(75) Inventors: Clemens Drews, San Jose, CA (US); Eben M. Haber, Cupertino, CA (US); Mark A. Smith, Los Gatos, CA (US); John C. Tang, Palo Alot, CA (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 12/626,207

(22) Filed: Nov. 25, 2009

(65) Prior Publication Data

US 2011/0125716 A1 May 26, 2011

(51) Int. Cl.
G06F 7/00 (2006.01)
G06F 17/00 (2006.01)
(52) U.S. Cl. .......................................... 707/690; 707/692
(58) Field of Classification Search .................. None
See application file for complete search history.

(56) References Cited

U.S. PATENT DOCUMENTS

| | | | | |
|---|---|---|---|---|
| 5,253,184 | A * | 10/1993 | Kleinschnitz | 702/184 |
| 5,692,120 | A * | 11/1997 | Forman et al. | 714/10 |
| 6,047,294 | A | 4/2000 | Deshayes et al. | |
| 6,122,629 | A * | 9/2000 | Walker et al. | 707/613 |
| 6,374,363 | B1 | 4/2002 | Wu et al. | |
| 6,542,975 | B1 | 4/2003 | Evers et al. | |
| 6,618,735 | B1 * | 9/2003 | Krishnaswami et al. | 1/1 |
| 6,651,183 | B1 * | 11/2003 | Gensler et al. | 714/4.3 |
| 6,675,177 | B1 | 1/2004 | Webb | |
| 6,725,392 | B1 * | 4/2004 | Frey et al. | 714/6.12 |
| 7,103,602 | B2 | 9/2006 | Black et al. | |
| 7,155,465 | B2 | 12/2006 | Lee et al. | |
| 7,222,143 | B2 | 5/2007 | Childs et al. | |
| 7,287,019 | B2 | 10/2007 | Kapoor et al. | |
| 7,523,086 | B1 * | 4/2009 | Teague et al. | 1/1 |
| 2002/0091843 | A1 * | 7/2002 | Vaid | 709/230 |
| 2003/0009480 | A1 * | 1/2003 | Lin et al. | 707/200 |
| 2004/0123068 | A1 * | 6/2004 | Hashimoto | 711/206 |
| 2004/0158562 | A1 | 8/2004 | Caulfield et al. | |
| 2005/0066234 | A1 * | 3/2005 | Darringer et al. | 714/38 |
| 2005/0102567 | A1 * | 5/2005 | McGuire et al. | 714/25 |
| 2007/0130232 | A1 * | 6/2007 | Therrien et al. | 707/204 |
| 2007/0255822 | A1 * | 11/2007 | Thiel et al. | 709/224 |
| 2008/0005201 | A1 | 1/2008 | Ting et al. | |
| 2008/0013830 | A1 | 1/2008 | Patterson et al. | |
| 2008/0016131 | A1 | 1/2008 | Sandorfi et al. | |
| 2008/0104146 | A1 | 5/2008 | Schwaab et al. | |
| 2008/0228835 | A1 * | 9/2008 | Lashley et al. | 707/202 |
| 2009/0217018 | A1 * | 8/2009 | Abrashkevich et al. | 712/244 |
| 2010/0250497 | A1 * | 9/2010 | Redlich et al. | 707/661 |

\* cited by examiner

*Primary Examiner* — Pierre Vital
*Assistant Examiner* — Taelor Kim
(74) *Attorney, Agent, or Firm* — Shimokaji & Assoc., PC

(57) ABSTRACT

A method for assisting an administrator to identify files suspected of causing instability on a personal computer comprises periodically creating file content sharing logs concurrently with archiving files of a plurality of personal computers by de-duplicating, when a notification is received regarding instability of a personal computer, then analyzing archive file content sharing log of the personal computer made immediately after receiving the notification for unique system and program files, missing files and newly installed files to generate an instability report. A missing or corrupted file can be restored back on the unstable personal computer by performing a backup restore operation on the unstable personal computer.

22 Claims, 4 Drawing Sheets

FINDING AND FIXING STABILITY PROBLEMS IN PERSONAL COMPUTER SYSTEMS

BACKGROUND

The invention relates generally to personal computer software and more particularly, to a method of identifying files that may be causing stability problems on a personal computer.

Due to the complexity of software installed on today's personal computers, stability of the software is a challenging problem. The totality of software installed on a typical personal computer includes a vast number of interrelated pieces such as libraries, configuration files, and registry settings. For example, a standard installation of a typical operating system may have more than 5000 system libraries. In addition, installed programs can have many more libraries and other required files. Corruption of any of these files or any change that causes an incompatible interaction between various elements of the operating system or the installed software can cause crashes or unexpected behavior. Such instability can be extremely hard to diagnose given the large number of potential causes. These failures usually develop over time—when a computer is new, it functions well, but problems can arise as software and operating system patches are installed. In addition, regular operation occasionally results in corrupted files or inadvertent deletion of useful files. A common practice when computers malfunction, and the problem is not quickly diagnosed, is to wipe a computer clean, reinstalling all software. Re-installation is drastic and time consuming, especially for the end-user who must re-install any additional software they need, but often there is no other solution available.

Software restoration of a computer from its previously backed up archives is known in the prior art. Conventional backup systems can restore earlier versions of user files. None of these systems, however, address the question of determining exactly which files have changed over time, and which changes are most likely to have caused the problem. Restoring a system to an earlier state can also be a drastic solution, as many innocent and useful changes may be lost.

As can be seen, there is a need for a method of identifying files that may be causing stability problems on a computer system.

BRIEF SUMMARY

In one embodiment of the present invention, a method of finding a cause of stability problem in a computer connected to a computer network, the computer network comprising a plurality of computers, at least one of which is designated a system administrator, is disclosed. The method comprises creating a plurality of file content sharing logs for files from the computers, if a notification of an instability in the computer is received, then selecting a candidate file content sharing log to analyze by either choosing a post-instability file content sharing log or if no post-instability file content sharing log is available then by creating a new file content sharing log and using the new file content sharing log as the candidate file content sharing log, analyzing the selected file content sharing log for instability of said computer, and generating, in part by determining a uniqueness of files in the selected candidate file content sharing log, an instability analysis report comprising a list of suspicious files suspected to be a cause of the stability problem in the computer.

In another embodiment of the present invention, a computer program product is disclosed comprising a computer readable medium including a computer program, wherein the computer program when performed on a computer connected to a computer network causes the computer to implement a method of finding a cause of stability problem in another computer connected to the computer network, the computer program product including code for creating a plurality of file content sharing logs for files on said another computer, selecting, depending on a time of creation, a file content sharing log to analyze from said plurality of file content sharing logs, analyzing files in said selected file content sharing log for instability of said computer, generating an instability analysis report comprising a list of suspicious files, and identifying files installed on said computer within a predetermined time window prior to said instability problem.

In yet another embodiment of the present invention, a method of restoring stability of an unstable computer in a network having a plurality of computers is disclosed, comprising creating, at various times, a plurality of file content sharing logs for the unstable computer and the plurality of computers, receiving a notification of instability in the unstable computer, checking availability of an instability analysis report for the unstable computer, if no instability analysis report is available for the unstable computer, then generating an instability analysis report by using at least one file content sharing log of the unstable computer and a plurality of file content sharing logs from substantially all of said plurality of computers and performing a backup restore operation on the unstable computer.

In still another embodiment of the present invention, a computer program product is disclosed, comprising a computer useable medium including a computer readable program, wherein the computer readable program when performed on a computer connected to a network causes the computer to implement a method of restoring stability of another computer connected to the network, the computer program product including, computer usable program code for periodically creating a file content sharing log for the another computer, computer usable program code for receiving a notification of instability in the another computer, computer usable program code for generating an instability analysis report for the another computer, and computer usable program code for performing a backup restore operation on the another computer; the backup restore operation restoring on the another computer at least one file listed in the instability analysis report.

These and other features, aspects and advantages of the present invention will become better understood with reference to the following drawings, description and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention can be embodied in a product such as Tivoli Storage Manager™ by International Business Machines (IBM®) Corporation.

In a typical backup operation, every time a backup archive is created for a computer using backup software, a database on a server keeps track of every file that has changed on the user's computer, and also every file that is shared with other computers. This information can be used to perform de-duplication on the backup archive so that files already backed up for other computers are not backed up again in the backup archive of the user's computer. The de-duplication can be performed using a de-duplication algorithm that finds similarities between the files used by different people, such as described in co-pending and co-owned patent application (U.S. patent application Ser. No. 11/969,517) entitled "Backing Up A De-Duplicated Computer File-System Of A Computer System," the disclosure of which is incorporated in its entirety herein.

Figure 1:
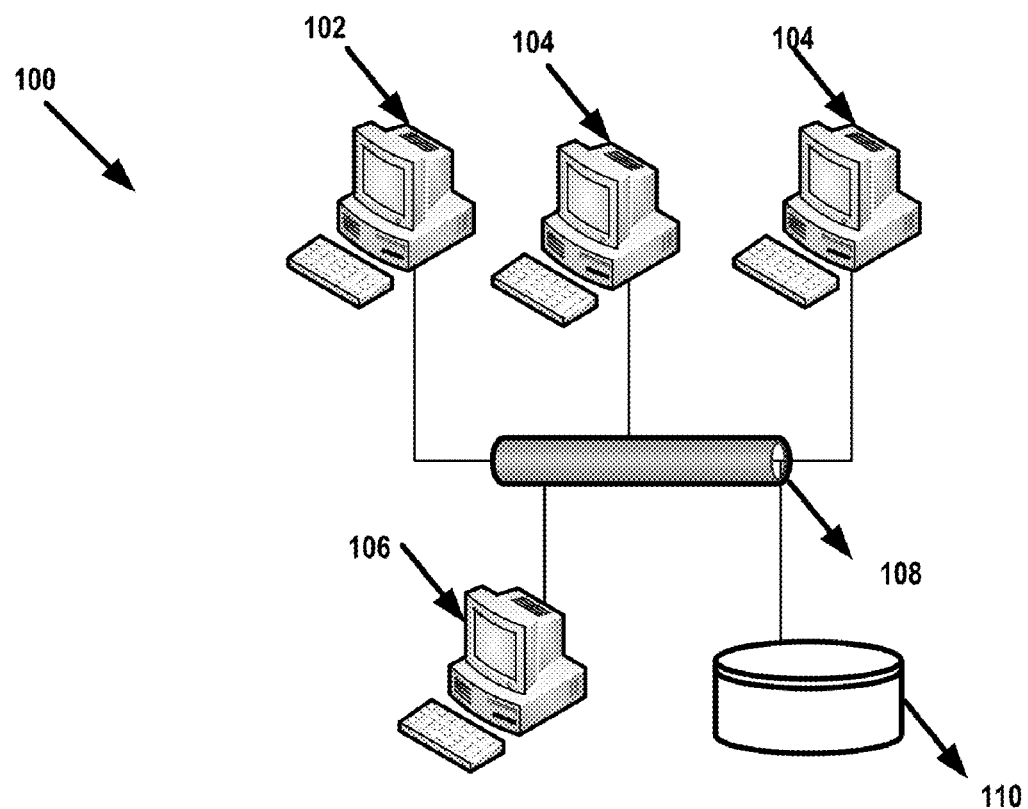
FIG. 1 is a schematic illustration of a computer network where the present invention can be implemented.

FIG. 1 shows an exemplary computer network 100 where the method of present invention can be implemented. A computer 102 is connected with one or more other computers 104, and a management computer 106 via a network connection 108. The network connection 108 may comprise of one or more technologies such as the Ethernet and 802.11 wireless networks. A data storage unit 110 is also connected to the network. The computer network 100 could, for example, be a corporate network. In such a case, the management computer 106 may be a system administrator's computer. In the description below, the terms "management computer" and "system administrator" are used interchangeably to describe element 106 because the system administration function may be performed wholly or partly by a human operator and wholly or partly by a system administrative software performed on the management computer 106. For ease of explanation, it is assumed that the computer 102 and other computers 104 in the computer network 100 are "equivalent" to each other; i.e., they have the same or similar operating system and many of the devices and programs on all the computers are similar to each other. However, the present invention can also be implemented in a computer network that comprises computers with different operating systems or hardware platforms too. One of the computers 104 may also function as the de-duplicating database server.

It is common practice to perform periodic backups of the computers 102 and 104 in the computer network 100. The backup process is typically managed by the system administrator using the system administrator's server computer 106 and creates archives for each computer in the storage unit 110. Because the computers 102 and 104 are equivalent, many of the system and programs files, device drivers, etc. are typically identical. In such a case, de-duplication can be used to archive only a single copy of such commonly shared files on storage 110. In an exemplary embodiment, the client computer 102 or 104 may start the backup process (e.g., on a regular schedule or at a user's request), and the server computer 106 may receive and store the files being backed up.

Figure 2:
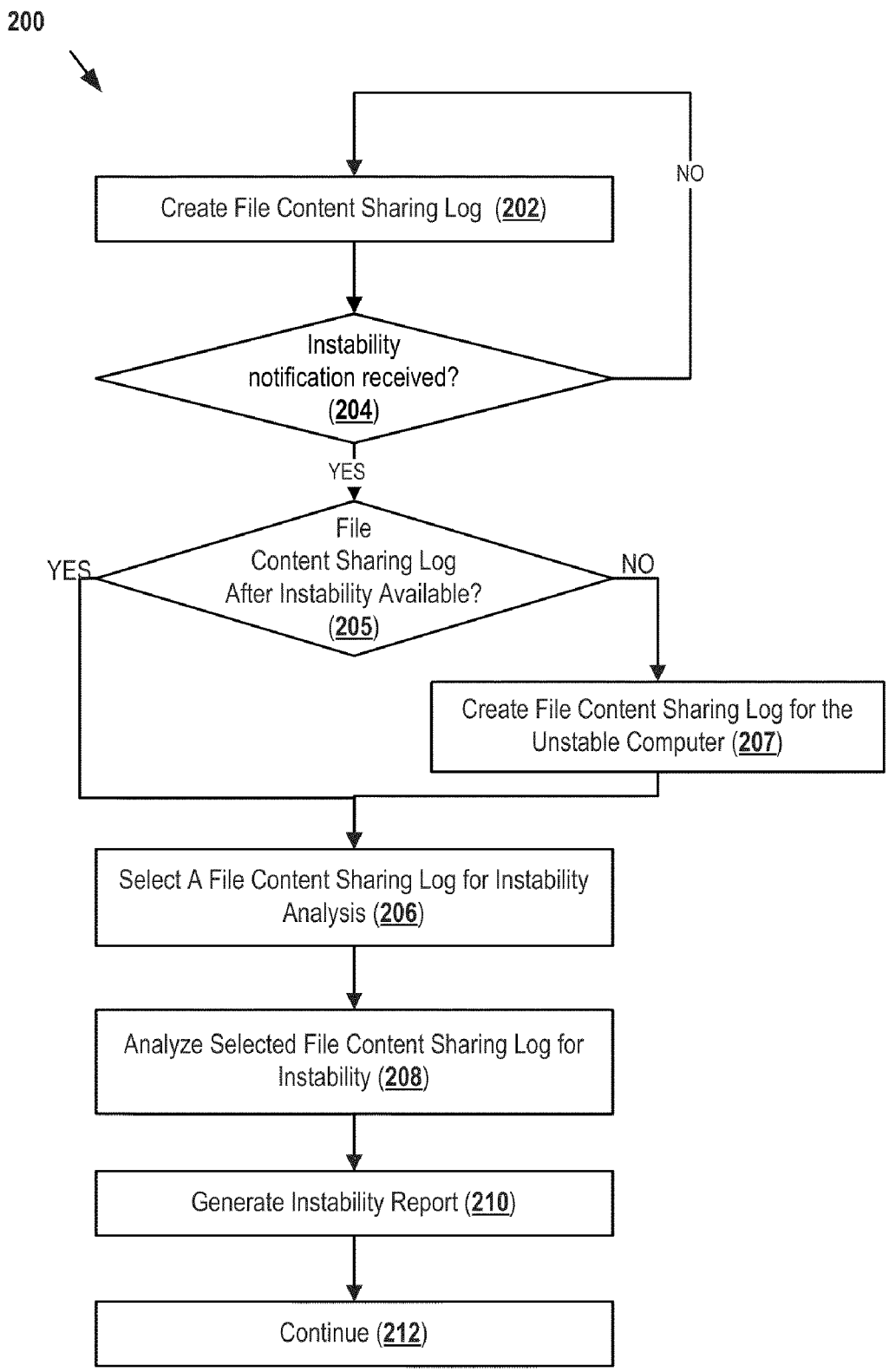
FIG. 2 is a flow chart showing exemplary steps of a method of identifying problematic files in an unstable computer system.

FIG. 2 shows a flow chart 200 of steps of a method of finding a cause of stability problem in an unstable computer. In step 202, the system administrator 106 creates a periodic file content sharing log for the computer 102. The file content sharing log may contain a list of files indicating which files are unique to the computer 102 and which files are shared with other computers 104 in the network 100. The file content sharing log may also contain an indicator of the extent to which the files are shared with other computers 104. For example, some shared files may be identically present on other computers, while other shared files may be substantially identical, but may differ in an attribute of the file such as a version number or time last saved or time last printed and so on. In one embodiment, the file content sharing log may be created by obtaining a list of files on computers 104 and 102 and by comparing these files to determine shared files and unique files. In another embodiment, the system administrator 106 may generate the file content sharing log of a computer 102 or 104 concurrently with performing a backup of the computer. In a preferred embodiment, the system administrator 106 may generate the file content sharing log for a file concurrently with performing a de-duplicated backup archive for a computer 102 or 104. Because the process of creation of a de-duplicated backup archive performs a comparison of the contents of every file being backed up on computer 102 with the contents of every (or substantially all) file on every (or substantially all) other computer 104 on the network 100, the file content sharing log can be advantageously created concurrently with creating a de-duplicated backup archive.

The de-duplication may result in a de-duplicated backup archive that includes backed up versions of unique files and reference strings, such as pointers for de-duplicated files. The system administrator 106 may configure the computer network and administrative tools such that in the absence of a notification regarding instability of the computer 102 (decision box 204), the process of creation of a file content sharing log, such as creation of a de-duplicated backup archive 202 may be performed on a regular basis, e.g., daily or weekly. Each time a file content sharing log is created for the computer 102, the system administrator 106 may associate a timestamp with it to identify when the file content sharing log was performed. If the system administrator 106 receives notification regarding instability of the computer 102, the system administrator 106 may then check, in step 205, if a post-instability (i.e., created after estimated time of onset of instability received in the instability notification) file content sharing log, such as made concurrently with a de-duplicated backup archive is available. If a post-instability file content sharing log is available, the system administrator 106 may then proceed to step 206 to select a post-instability file content sharing log for the unstable computer 102 as a candidate file content sharing log to analyze. In one embodiment, if more than one post-instability file content sharing logs is available, the system administrator 106 may choose the log closest in time to the estimated time of onset of instability. Otherwise, the system administrator 106 may generate a file content sharing log for the unstable computer (step 207). In one embodiment, the system administrator may generate the log by performing a de-duplicated backup of the unstable computer (step 207) and generating a file content sharing log during the generation of this backup archive. In another embodiment, the system administrator 106 may generate the file content sharing log by querying the unstable computer 102 and generating a list of all (or substantially all) files on the unstable computer 102. The system administrator 106 may also generate additional information that providing indication of content of the files. For example, the system administrator 106 may generate a unique digital signature for each file. One such example of generation of key is given in the co-pending and co-owned patent application (Ser. No. 11/562,084) cited above. In yet another embodiment, the system administrator 106 may obtain the file content sharing log concurrently with performing a backup of the unstable computer 102. The system administrator 106 may use this new file content sharing log as the candidate file content sharing log. In some embodiments, the unstable computer 102 may be so badly corrupted that the system administrator 106 may have to use special techniques, such as booting from a compact disc (CD) or an external device, to enable the unstable computer 102 to be placed a state in which a backup can be performed. In step 205 the system administrator 106 may identify, based on the timestamp of creation of the file content sharing log, a post-instability file content sharing log for the computer 102 performed at a time closest to but after the indicated time of instability. Next, in step 208, the system administrator 106 may analyze the selected file content sharing log for performing instability analysis. The result of this instability analysis may then be presented to a human operator in the form of an instability report generated in step 210. Subsequent to the generation of the report, in the next step 212, the system administrator may then continue with further analysis or remedial steps.

Figure 3:
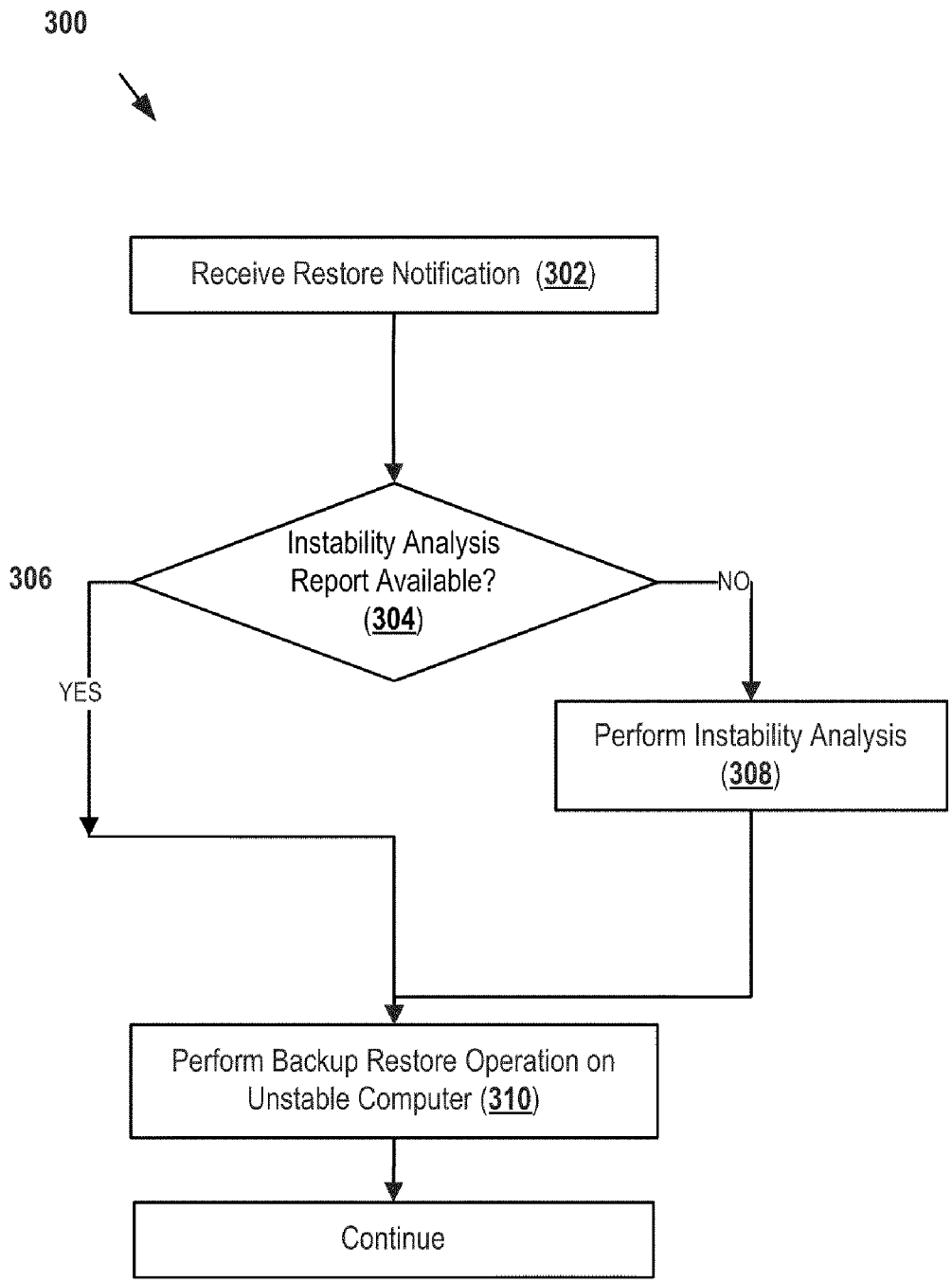
FIG. 3 is a flow chart showing exemplary steps of a method of restoring files of an unstable computer system to a stable configuration.

FIG. 3 shows a flow chart of a restoration of the files on an unstable computer 102 to a stable configuration. In step 302, the system administrator 106 receives a notification to restore a stable set of files on an unstable computer 102. In step 304, the system administrator 106 may check if an instability analysis report is available for the computer 102. If an instability analysis report is not available, the system administrator 106 may perform an instability analysis in step 308, as shown in steps 208 and 210 of FIG. 2 and discussed supra. The instability analysis may generate an instability analysis report that lists one or more files that are "suspicious." The report may also contain a probability weight associated with entries in the list. For example, in one embodiment, the system administrator 106 may use a two-tiered system in which files might be marked as being "less probable" and "more probable" cause of instability. Various other embodiments of assigning weights are possible. In some embodiments, a human operator may inspect this list of suspicious files and provide inputs regarding which file(s) need to be restored to their earlier stable versions. Using the instability analysis report and the additional operator input, the system administrator 106 may then perform a backup restoration operation 310 to restore a stable set of files onto the unstable computer 102. This backup restoration may advantageously be used to install missing files or software patches also. The backup restoration may also result in deletion of one or more files, including system and program files, because they were deemed suspicious by the system administrator 106. In some embodiments, this may have the same effect as "uninstalling" a software program.

In various embodiments, the system administrator 106 may perform the instability analysis in step 308 by either periodically generating file content sharing logs for computers 102 and 104 in the network, or by generating file content sharing logs when needed by querying computers and generating lists of files on the computers or by creating lists of files for the computers and concurrently performing backup of file systems on the computers. This step may either be performed on all computers 104 in the network 100, or by performing on substantially all computers 104 such that the system administrator 106 is able to get a level of confidence regarding duplication or uniqueness of files. For example, in one embodiment, all computers 104 that have the same operating system installed on them may be included in step 308, and in turn in steps 208 and 210, for file content sharing log.

Figure 4:
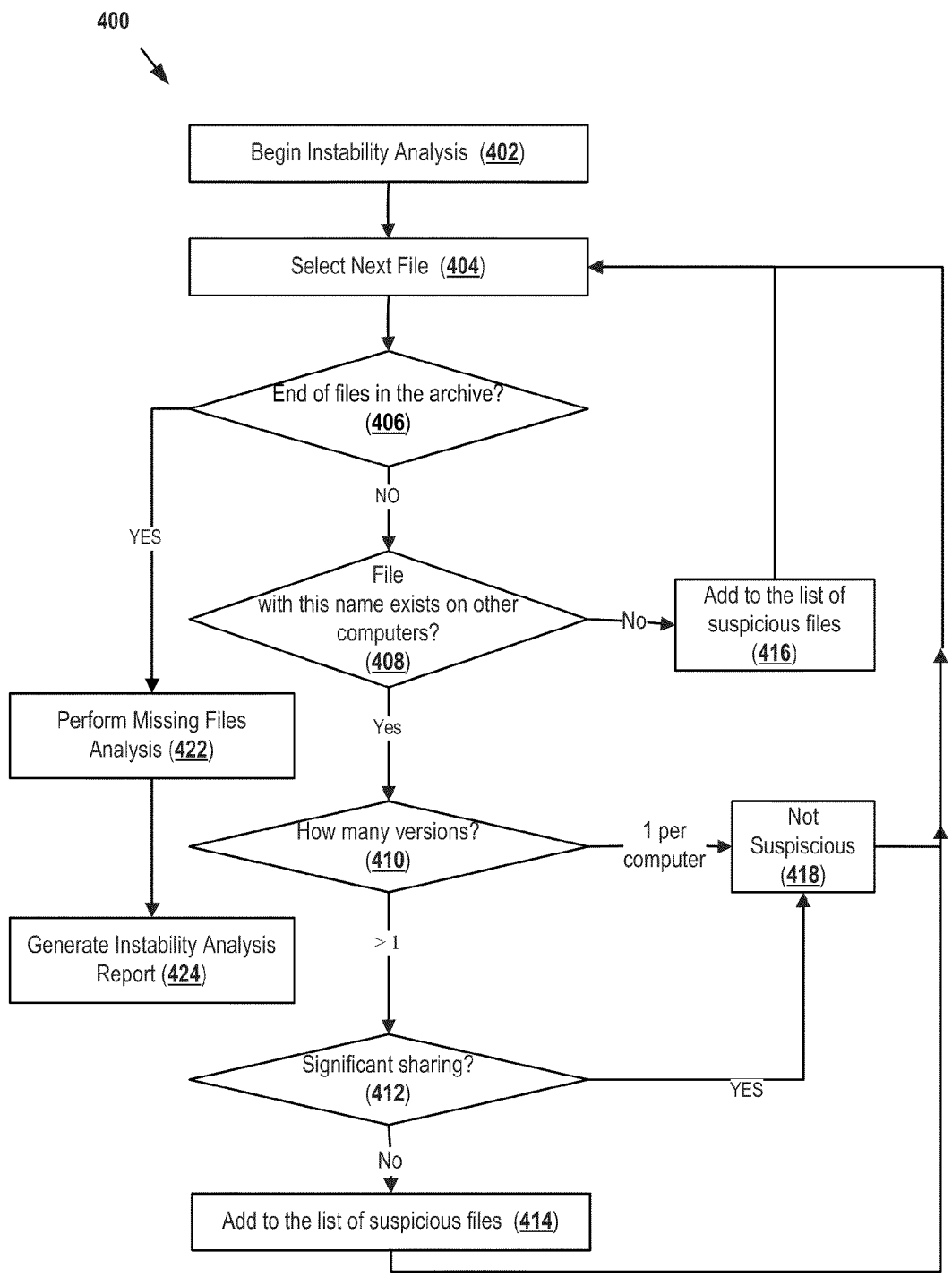
FIG. 4 is a flow chart showing exemplary steps of a method of performing instability analysis of a de-duplicated backup archive.

FIG. 4 shows a flow chart 400 of steps for analyzing a de-duplicated backup archive file such as implemented at step 208 shown in FIG. 2. The system administrator 106 may, in a de-duplication backup log file, keep track of a uniqueness of a file by remembering how many versions of each file in the network exists, and which computers have which versions. The system administrator 106 may use this information advantageously in determining which files may be suspect files for the instability of computer 102. For example, if all similar computers share a single version of a file, then the file may be deemed as not a cause of the instability. Similarly, if the version of a file is different on every computer, it is probably not the source of instability. If, however, the majority of computers 104 have one version of a file, and the unstable computer 102, and possibly a few others, has a different version, then that file may possibly represent a corrupt file, a problematic upgrade, or malware, such as a virus. This analysis is highly efficient, since the de-duplication process has already done the work of comparing the file contents and determining how many versions of each file exist. Furthermore, since many valid computer configurations exist, this analysis may be used to automatically find those other computers that are most similar to the unstable computer, to help pinpoint those files that should be the same as on other computers, but are not.

In step 402, the system administrator 106 may begin an analysis of the de-duplicated backup archive. The analysis may proceed sequentially through all system and program files in the backup archive by first selecting, in step 404, a next file to analyze. Generally speaking, backup archive for a computer will comprise system files, which are typically identical to system files of all computers having the same operating system, program files, which relate to programs installed on the computer, and user created files, which are typically files cached during use of an application by a user (e.g., temporary internet files) or created by the user (e.g., emails and documents) and are therefore uniquely present on the computer. FIG. 4 shows an embodiment where instability analysis is performed sequentially on different file types. In other embodiments, the analysis may be preformed serially by sorting files alphabetically or based on file size or time of creation or last edit time, etc. In yet other embodiments, a concurrent analysis multiple files or file types may be performed.

If there is no next file available (decision box 406) because the end of the de-duplicated backup archive is reached, the system administrator 106 may then perform a missing files analysis 422 to identify any files that should have been presented on the computer but were not found and generate an instability analysis report (step 424). For determination of missing files, the system administrator 106 may take into account computer-specific information such as the operating system, hardware platform, installed applications, etc. Because newly installed files may sometimes cause instability in a computer, the system administrator 106 may also include a list of recently installed files in the instability analysis report. The system administrator 106 may use a predetermined time window to decide significance of a recently installed file for the stability analysis. For example, the predetermined time window may be a fixed period, e.g., one day or one week. The predetermined time window may be responsive to the frequency with which the de-duplicated backup archives are generated. In some embodiments, the predetermined time window may include a number of most recent installations performed on the computer. For example, if a file was installed in two most recent installations on the computer, it may be added to the list of potential suspicious files. If a next file is available for analysis at decision box 406, the system administrator 106 may check, in step 408, if the selected file has the same name as other files that exist on other equivalent computers 104 in the network 108. If the answer is "no", the system administrator 106 may note, in step 416, the file as being uniquely-named to the computer 102, and add the file to a list of suspicious files. In a preferred embodiment, the system administrator 106 may compare the file content of such a uniquely-named file with file content of files on other computers 104. The system administrator 106 may perform this comparison because content overlap of uniquely-named files may be an indication of self-modifying malware, different versions of software, or other possible stability problems. The system administrator 106 may use a degree of content overlap to mark the probability weight for suspiciousness of the file. In one embodiment, the system administrator 106 may calculate an amount of overlap as a ratio and compare with one or more predetermined thresholds to determine the probability weight. For example, if the amount of overlap is more than a first threshold, but less than a second threshold, the probability weight may be marked as "moderately suspicious." If the amount of overlap is below the first threshold, the probability weight for the file may be marked as being "less suspicious" because empirical evidence suggests that such a file is typically a less frequent cause of system instability. In one embodiment, the amount of overlap as a ratio may be calculated as a distance between digital hashes of the files compared. In another embodiment, the amount of overlap as a ratio might be calculated between identical byte patterns divided by total number of bytes in a file. Processing may then proceed back to step 404 and select a next file to analyze. If in step 408, the system administrator 106 may determine that a file with the same name or same content exist on other computers 104 in the network 100, the system administrator 106 may check how many different versions (e.g., based on time of creation) exist for the file (step 410). If each computer 104 has its own version of the file, then the file may not be deemed suspicious in step 418 and the system administrator 106 may proceed to analyze a next file (step 404). If the file being analyzed has greater than one version, then the system administrator 106 may next check (step 412) if there was significant sharing of that file among computers 104 of the network 100. The test of "significant" may be decided by each system administrator 106 based on the knowledge of the network 100, the type of computers and operating systems installed in the network 100. If there is significant sharing of the file among various computers 104, as can be determined by looking at de-duplicated backup archives of other computers, then the system administrator 106 may deem the file as not suspicious (step 418) and select a new file to analyze (step 404). If the system administrator 106 determines in step 412 that the file is not being significantly shared, then it may add the file name to the list of the suspicious files (step 414) and select a next file to analyze (step 404). In a preferred embodiment, the probability weight for the file may be marked as being "more suspicious" because empirical evidence suggests that such a file is typically a more frequent cause of system instability. The analysis in step 412 may look at 1) how many other computers share the same version of a file as the unstable computer, and 2) how many other versions of that file exist, and how widely are they shared among other computers. In deciding whether the selected system file is a potential cause of instability, the system administrator 106 may use additional information, such as the version of operating system, whether computer 102 has a software patch that is not yet installed on other computers 104, etc. When the selected file is a program file, the system administrator 106 may check if a unique program was installed on the computer 102. The system administrator may also look up a database of programs installed on the computer 102 and programs installed on computers 104 in deciding if the selected program file is a potential cause of instability. The instability report generated in step 424 may contain files listed in the list of suspicious files, missing files and recently installed files.

It should be understood, of course, that the foregoing relates to exemplary embodiments of the invention and that modifications may be made without departing from the spirit and scope of the invention as set forth in the following claims. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction performance system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency, etc. Computer program code for carrying out operations of the present invention may be written in any combination of one or more programming languages, including an object oriented programming language and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The detailed description provided is of the best currently contemplated modes of carrying out the invention. The description is not to be taken in a limiting sense, but is made merely for the purpose of illustrating the general principles of the invention, since the scope of the invention is best defined by the appended claims.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood, of course, that the foregoing relates to exemplary embodiments of the invention and that modifications may be made without departing from the spirit and scope of the invention as set forth in the following claims.

What is claimed is:

1. A method for finding a cause of a stability problem and restoring stability in an unstable computer that is one of a plurality of computers connected to a computer network, at least one of which is designated a system administrator, said method comprising creating a plurality of file content sharing logs for files from said unstable computer and for files from said plurality of computers,
   wherein each of the file content sharing logs contains a list of files that are unique to the unstable computer, and wherein the file content sharing logs contain a list of files which the plurality of computers share with one another;
   if a notification of an instability in said unstable computer is received in one of the file content sharing logs from the unstable computer, then selecting a candidate file content sharing log to analyze by either choosing a post-instability file content sharing log or if no post-instability file content sharing log is available then by creating a new file content sharing log and using the new file content sharing log as the candidate file content sharing log;
   analyzing said candidate file content sharing log for instability of said unstable computer; generating an instability analysis report comprising a list of unstable files as a result of the analyzing of said candidate file content sharing log; and performing a backup restore operation on said unstable computer in which at least one file listed in said instability analysis report is restored on said unstable computer, wherein said at least one file listed in said instability analysis report is selected from a de-duplicated backup archive.

2. The method of claim 1, wherein said act of analyzing comprises analyzing at least one program file.

3. The method of claim 1, wherein said act of analyzing comprises analyzing at least one system file.

4. The method of claim 1, wherein said act of analyzing further comprises checking, for at least one file, if another file with a same name exists on a stable computer from the plurality of computers.

5. The method of claim 1, wherein said act of analyzing further comprises determining, for at least one file, a number of versions of said at least one file on a stable computer from the plurality of computers.

6. The method of claim 1, wherein said act of analyzing further comprises deciding, for at least one file, if there is significance sharing of said at least one file with a stable computer from the plurality of computers.

7. The method of claim 1, wherein said act of analyzing further comprises performing a missing file analysis to determine files missing from said unstable computer.

8. The method of claim 1, wherein said instability analysis report comprises a name of at least one of a missing file or a suspicious file.

9. A computer program product comprising a non-transitory computer readable storage medium including a computer program, wherein the computer program when performed on a stable computer connected to a computer network causes the computer to implement a method of finding a cause of a stability problem and restoring stability in an unstable computer that is connected to the computer network; said computer program product including:
   computer usable program code for creating a plurality of file content sharing logs for files from said unstable computer and for files from said plurality of computers, wherein each of the file content sharing logs contains a list of files that are unique to the unstable computer, and wherein the file content sharing logs contain a list of files which the plurality of computers share with one another;
   if a notification of an instability in said unstable computer is received in one of the file content sharing logs from the unstable computer, then selecting a candidate file content sharing log to analyze by either choosing a post-instability file content sharing log or if no post-instability file content sharing log is available then by creating a new file content sharing log and using the new file content sharing log as the candidate file content sharing log;
   computer usable program code for analyzing said candidate file content sharing log for instability of said unstable computer;
   computer usable program code for generating an instability analysis report comprising a list of unstable files as a result of the analyzing of said candidate file content sharing log; and
   computer usable program code for performing a backup restore operation on said unstable computer in which at least one file listed in said instability analysis report is restored on said unstable computer, wherein said at least one file listed in said instability analysis report is selected from a de-duplicated backup archive.

10. The computer program product of claim 9, wherein said act of analyzing comprises analyzing at least one of a program file or a system file.

11. The computer program product of claim 9, wherein said act of analyzing comprises determining a hardware profile of said unstable computer.

12. The computer program product of claim 9 further comprising computer usable program code for checking, for at least one file, if another file with a same name exists on said unstable computer connected to said computer network.

13. The computer program product of claim 9 further comprising computer usable program code for determining, for at least one file, a number of versions of said at least one file on said unstable computer connected to said computer network.

14. The computer program product of claim 9 further comprising computer usable program code for deciding, for at least one file on said unstable computer connected to said computer network, if there is significance sharing of said at least one file with said unstable computer connected to said computer network; said deciding responsive to a predetermined threshold of significance.

15. The computer program product of claim 9 further comprising computer usable program code for performing a missing file analysis to determine files missing from said unstable computer connected to said computer network.

16. The method of claim 1, wherein said at least one system file is selected from a de-duplicated backup archive created at a time prior to receiving said notification of instability.

17. The computer program product of claim 1, wherein said act of analyzing comprises analyzing at least one of a program file or a system file.

18. The method of claim 1, wherein said backup restore operation deletes at least one system file on said unstable computer; said at least one system file reported in said instability analysis report as being installed on said unstable computer within a predetermined time window prior to receiving said notification of instability.

19. The method of claim 17, wherein said backup restore operation deletes at least one program file on said unstable computer; said at least one program file reported in said instability analysis report as being installed on said unstable computer within a predetermined time window prior to receiving said notification of instability.

20. The method of claim 1, wherein said backup restore operation is performed using a de-duplicated backup archive created before receiving said notification of instability.

21. The method of claim 1, wherein said backup restore operation is performed using a de-duplicated backup archive created after receiving said notification of instability.

22. The method of claim 17, wherein said at least one program file is selected from a de-duplicated backup archive created at a time after receiving said notification of instability.

* * * * *